March 8, 1949.  E. DANNER  2,464,028
MANUFACTURE OF TUBULAR GLASSWARE
Filed May 18, 1945  2 Sheets-Sheet 1

INVENTOR
*Edward Danner*
By Stebbins, Blenko & Webb
attorneys.

March 8, 1949.                    E. DANNER                    2,464,028
                       MANUFACTURE OF TUBULAR GLASSWARE
Filed May 18, 1945                                           2 Sheets-Sheet 2

INVENTOR
Edward Danner

Patented Mar. 8, 1949

2,464,028

UNITED STATES PATENT OFFICE 2,464,028

MANUFACTURE OF TUBULAR GLASSWARE

Edward Danner, Newark, Ohio

Application May 18, 1945, Serial No. 594,567

12 Claims. (Cl. 49—17.1)

1

The present application is a continuation-in-part of my copending application Serial No. 498,971, filed August 17, 1943, which issued as Patent No. 2,420,934, May 20, 1947 and which application is a continuation-in-part of my application Serial No. 235,300, filed October 17, 1938, which has now become abandoned.

The present invention relates to the manufacture of glassware, and more particularly to apparatus for forming hollow glassware such as glass tubing and the like. While my invention is especially adapted to the manufacture of glass tubing having a solid cylindrical wall, it is equally applicable to the manufacture of tubing formed of cellular glass and to the manufacture of tubing having other than a cylindrical configuration. However, it will be described herein as applied to the manufacture of ordinary tubing having a solid cylindrical wall. It is described hereinafter as applied to the manufacture of glassware in an ordinary day tank, although it will be readily apparent that my invention is equally usable in connection with the forehearth of a continuous melting tank.

Heretofore considerable difficulty has been experienced in the manufacture of glass tubing due to the fact that drawing lines were imparted to the finished product by the shaping apparatus. It has been necessary to exercise great care in the operation of tube-making machines in order to minimize such drawing lines. Moreover, the forming rate has been relatively slow, with the result that manufacturing costs have been unduly high. This has been particularly true in respect of the manufacture of tubing having a relatively thick wall. The present invention overcomes these deficiencies inherent in the apparatus employed at the present time and provides an apparatus whereby high quality tubing can be manufactured at a relatively high forming rate and at appreciably lower manufacturing costs.

The nature of the invention disclosed and claimed in this application can be explained best by reference to the embodiments thereof disclosed in the accompanying drawings and the descriptive matter set forth hereinafter in respect thereof. However, it should be understood that my invention is not limited to the embodiments shown in the drawings as they are merely for illustrative purposes.

Figure 1:
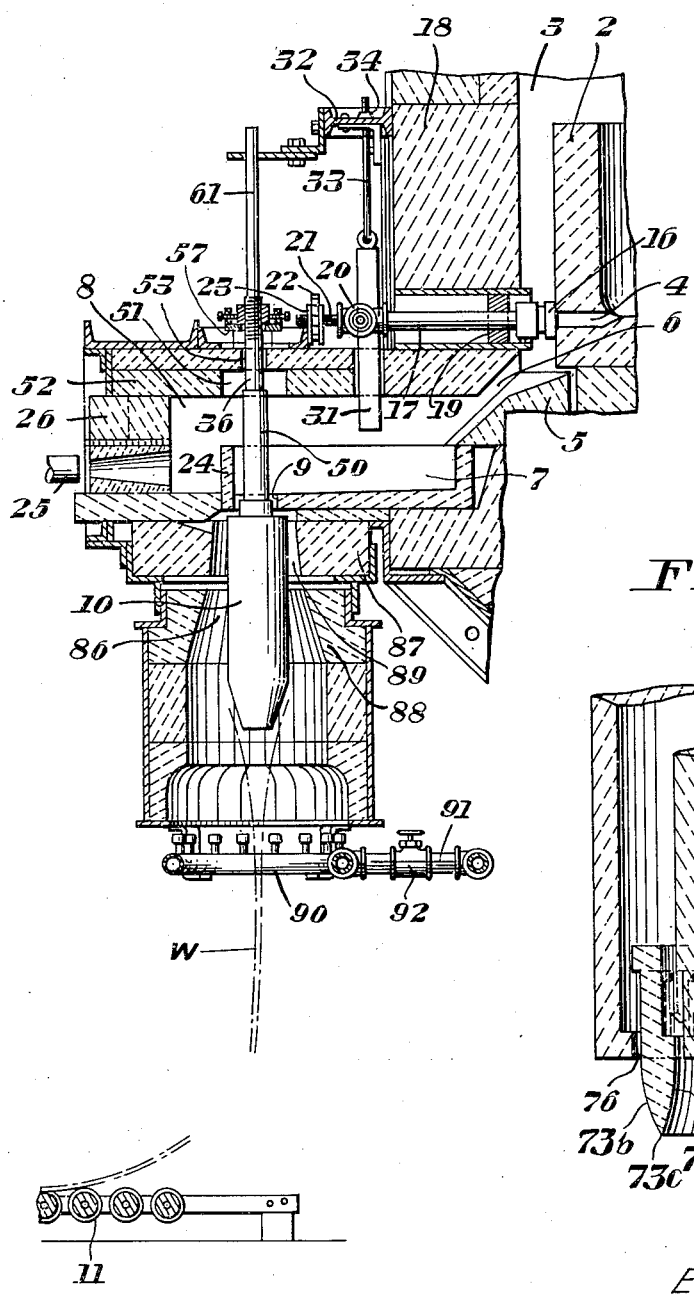
Fig. 1 is a vertical section through an end of a day tank embodying my invention.
Figure 2:
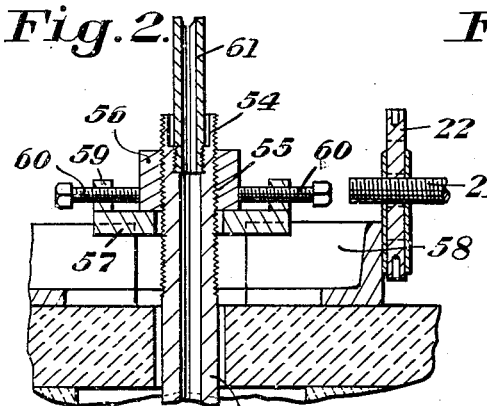
Figure 2 is an enlarged vertical section taken
Figure 3:
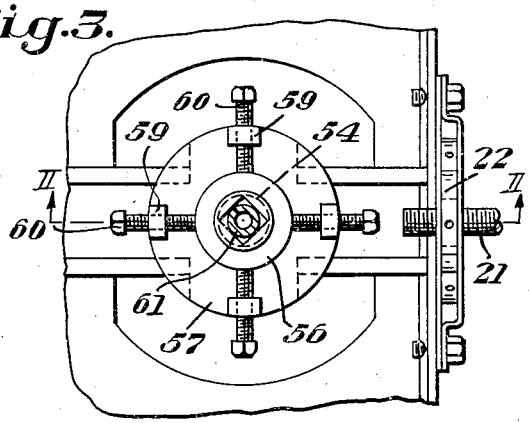

2 along the line II—II of Figure 3 showing the shaping element and supporting means illustrated in Figure 1;

Fig. 3 is a plan view of the apparatus illustrated in Fig. 2 and showing the apparatus for adjustably locating the glass-shaping element with reference to the stream of glass that is intercepted by the shaping element.

Figure 7:
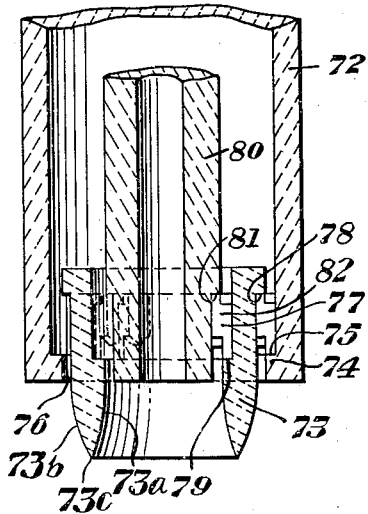
Figure 5:
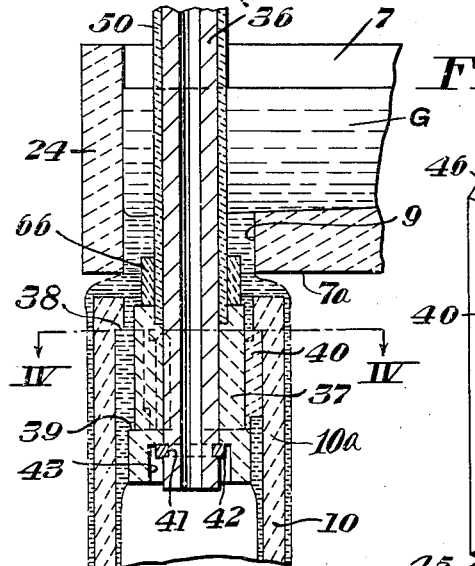
Figure 5:
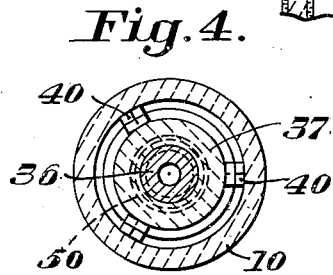
Figure 6:
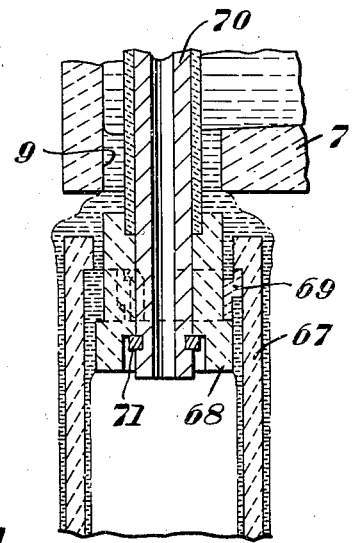
Figure 4:
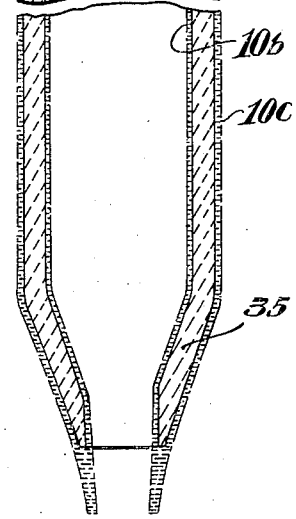

Fig. 4 is a section taken along the line IV—IV of Fig. 2;

Fig. 5 is an enlarged perspective view illustrating one of a plurality of spacing keys for connecting the glass-shaping element to a supporting member;

Fig. 6 is a partial longitudinal section illustrating a modified form of shaping element and the supporting apparatus; and Fig. 7 is a partial vertical section illustrating another form of shaping element and the supporting means.

In the apparatus illustrated in Figs. 1 to 5, inclusive, the molten glass G is melted in a container 2 in the furnace chamber 3. The glass passes through the outlet 4, and, when the apparatus is in operation, it is deposited on a refractory block 5 and passes through the inlet 6 to the trough 7 which is mounted in the glass-receiving chamber 8. The trough 7 has an opening 9 in the bottom thereof through which the glass is discharged continuously onto a shaping element 10. The glass passes over the shaping element in the manner which will be described hereinafter and is thereby formed into ware W, which continues downwardly and is received on horizontally disposed rollers 11 which carry it to a station where it may be cut to any desired length.

The glass-forming batch mixture placed in the container 2 is melted while in the container by a flame adapted to surround the container which, as stated above, is positioned in the chamber 3.

The flow of the glass from the container 2 into the trough 7 is controlled by a closure member 16 which is formed of heat-resisting metal and is carried by a pipe 17 that extends through the wall 18 of the furnace. The pipe 17 is supported by a refractory block 19 which is located within the opening through which the pipe 17 extends into the furnace. The outer end of the pipe 17 is connected to a T-fixture 20. The closure member 16 is moved to and from the surface of the container at the outlet 4 by means of a stud 21 that is connected to the end of the T-fixture 20. The stud extends through a hand wheel 22 located intermediate the sides of a frame 23. This frame is secured to the frame of the furnace. When the wheel 22 is rotated, it moves the stud 21 and thereby moves the closure member 16 toward and from the surface of the container to close and open the outlet 4.

The outlet 9 in the bottom of the trough 7 is preferably circular in form, and located adjacent the end wall 24 of the trough. To aid in the free movement of the glass through the outlet and maintain uniform liquidity, a burner 25 is disposed so as to project a flame through the side wall 26 of the chamber 8, and the flame impinges upon the wall 24 of the trough. As the flame strikes this wall, it divides and spreads over the surfaces of the inclined side walls, thereby maintaining a relatively high temperature in the glass in the trough as it approaches the outlet 9. With this arrangement, all of the glass that is directed into the trough from the container is maintained in a direct path toward the outlet and, consequently, the glass has little or no opportunity to become highly viscous adjacent the outlet.

A vertically movable curtain block 31 is located above the trough 7 in order to prevent any substantial transmission of heat between the furnace chamber 3 and the chamber 8 containing the trough. This permits the maintenance of different temperatures in these chambers. The curtain block also operates to deflect the flame from the burner 25 downwardly to and over the surface of the glass in the trough 7. The curtain block 31 is suspended from an I-beam 32 which is secured to the frame of the furnace. The curtain block 31 is suspended from this supporting means by rods 33. The ends of the rods 33 are threaded and extend through the I-beam 32, and adjusting nuts 34 are located on the upper ends of the rods and engage the upper side of the flange of the I-beam 32, whereby the curtain block may be adjusted with reference to the trough.

The glass-shaping element 10 is hollow and throughout most of its length is cylindrical in shape. However, the lower end 35 is tapered inwardly so as to reduce the diameter of the downwardly flowing body of glass on the shaping element to a diameter more closely approximating that of the finished ware.

The shaping element 10 is supported on a pipe 36 that is provided with a refractory bushing or head 37 which is located within the upper end 10a of the shaping element. The manner in which the pipe, bushing and shaping element are connected together will be described shortly. The pipe 36 is adjustably mounted so that the shaping element can be adjusted both vertically and horizontally with reference to the outlet 9. The horizontal adjustment assists in maintaining a proper distribution of the molten glass on the shaping element and the vertical adjustment can be utilized to control the flow of the glass through the outlet 9 so that a greater or lesser amount may be discharged to the shaping element in accordance with operating conditions and the wall thickness desired in the product. The upper end of the shaping element is spaced a short distance below the bottom surface 7a of the trough 7 and has a diameter greater than the diameter of the outlet 9, and as the shaping element is moved toward the bottom of the trough the flow of glass is restricted.

At its upper end the hollow glass-shaping element has an inwardly extending shoulder 38. The refractory bushing or head 37 is disposed within the upper end of the shaping element 10 adjacent the shoulder 38. This head or bushing is provided with an outwardly extending shoulder 39. The shaping element 10 is supported on the head or bushing 37 which is carried by the pipe 36 by spacing blocks or keys 40 extending between the shoulders 38 and 39. The pipe 36 has a circular channel 41 at the lower end thereof, and a split metal ring 42 is disposed in this channel to connect the bushing or head to the end of the pipe. The head 37 has a socket 43 in the end thereof which has a diameter sufficiently great to receive the metal ring 42 and retain the ring in position. In assembling the structure, the head 37 is placed on the pipe 36 above the channel 41 and the ring 42 is then placed in the channel 41 of the pipe 36 and then the head 37 is lowered to a position where it rests on the ring 42.

As indicated above, the glass-shaping element 10 is supported on the head by a plurality of spaced replaceable, refractory spacing blocks or keys that will permit movement of a glass stream along the inner surface 10b of the shaping element as well as along the outer surface 10c of the shaping element. The keys 40 are located between the outer surface of the head 37 and the inner surface of the element 10. The thickness of each key 40 is such as to extend completely from the inner surface of the element to the outer surface of the head. Where the parts fit together in the manner indicated, the shaping element is readily alignable with the pipe 36. The upper end of each key 40 has a surface 44 adapted to cooperate with the shoulder 38, and the lower end of the key has a surface 45 adapted to cooperate with the shoulder 39 on the head. The upper end of each key is also provided with relatively inclined surfaces 46 and 47, and the lower end of each key is likewise provided with relatively inclined surfaces 48 and 49. The inclined surfaces 46, 47, 48 and 49 form wedge-shaped sections at the ends and on opposite sides of each key. The wedge-shaped part of each key at the top thereof serves to divide the glass so that it will readily flow around the key and the wedge-shaped portion formed by the inclined surfaces 48 and 49 at the bottom end of each key permits the separated glass streams to readily come together again above the supporting surface 45 at the bottom of the key and the shoulder 39 on the head so that there will be no discontinuity in the flow of the glass passing between the lower end of the head and the shaping element and so that the glass will pass in a continuous film downwardly along the inner surface of the shaping element.

The pipe 36 is surrounded by a refractory protective sleeve 50. This sleeve and the pipe extend upwardly through the glass in the outlet 9 and in the trough 7. The sleeve 50 preferably extends upwardly to within the opening 51 in the top wall 52 of the chamber 8. The pipe 36 continues upwardly through this opening 51 and through an opening 53 in the top wall of the chamber 8. The upper end of the pipe 36 is provided with threads 54 cooperating with similar threads 55 carried by a bushing 56 for supporting and adjusting the parts carried by the pipe. The bushing 56 is supported on a plate 57 supported by the framework 58 of the furnace. The plate 57 has upwardly extending lugs 59 which are threaded to receive bolts 60. A plurality of these bolts are spaced around the bushing 56, and adjustment of these bolts causes the bushing 56 to move horizontally, and this in turn effects any desired horizontal adjustment of the pipe 36 and the shaping element and other parts supported on the pipe. Rotation of the pipe 36 or the bushing 59 due to the fact that they have corresonding threads, will serve to raise or lower the shaping element to any desired extent.

The upper end of the pipe 36 is interiorly threaded to receive a pipe 61 which supplies the pipe 36 with any desired amount of blowing air. The lower end of the pipe 36 is, of course, open and air in this way can be discharged into the interior of the shaping element 10 for cooling the glass as it flows downwardly along the inner surface thereof and for assisting in the formation of the desired tubular shape in the glass as it is discharged from the lower end of the shaping element.

A refractory collar 66 is located on the upper end of the head 37. This collar protrudes into the outlet and serves to assist in the varying of the flow of glass from the outlet, in accordance with existing operating conditions, as the glass-shaping element is raised or lowered by the apparatus just described. Of course, this collar 66, being smaller in diameter than the outlet 9, would not serve to completely stop the flow of glass through the outlet but it does, as stated, assist in the control of the flow of glass onto the shaping element.

In the embodiment shown in Fig. 6, the shaping element 67 is supported on the head 68 by keys 69 similar to but appreciably shorter than the keys 40 of the embodiment shown in Figs. 1 to 5, inclusive. The head or bushing 68 is maintained on the end of the pipe 70 by a ring 71 positioned in a circular slot in the pipe adjacent the end thereof.

In this embodiment, as in the embodiment shown in Figs. 1 to 5, inclusive, the glass passes downwardly through the outlet from the trough 7 and is deposited on the upper end of the shaping element. It flows downwardly around the shaping element and some of it passes downwardly around the outer surface thereof and some of it passes downwardly between the shaping element and the head carried by the supporting pipe and over the keys supporting the shaping element and continues downwardly along the inner surface of the shaping element. In the embodiment shown in Figs. 1 to 5, the diameter of the head 37 is not as great as the diameter of the outlet 9 and hence the principal regulation of flow of glass is effected by the upper end of the shaping element and the bottom of the trough, but in the embodiment shown in Fig. 6 the head 68 is approximately the same diameter as the opening 9 in the trough 7 and, consequently, the primary regulation of glass flow is effected between the head 68 and the bottom of the trough 7.

In Fig. 7 I have shown another form of shaping element. In this embodiment the glass is discharged from the outlet from the trough 7 into a conduit 72. Adjacent the bottom end of the conduit 72 there is a shaping element 73 which is supported in such a way that glass may flow downwardly along both the inner surface 73a and the outer surface 73b thereof. The conduit 72 has an inwardly extending flange 74 which provides a shoulder 75. The shaping element 73 is positioned in the outlet 76 in the bottom end of the conduit and it is supported there by a plurality of keys 77 similar to the keys 40 and 69. The upper end of the shaping element is provided with a shoulder 78, and the keys 77 are positioned between that shoulder and the inwardly extending shoulder 75 of the conduit 72.

The inner surface of the shaping element 73 is provided with an inwardly extending shoulder 79. The blow pipe 80 which extends downwardly through the conduit 72 is provided with an inwardly extending shoulder 81 adjacent the lower end thereof, and supporting keys 82 extend between the shoulders 79 and 81 to support the blow pipe 80 on the shaping element 73, which in turn is supported by the keys 77 on the bottom end of the conduit 72. The inner and outer surfaces 73a and 73b of the shaping element 73 are sloped toward each other at the lower end thereof so that they come to a point 73c at the bottom end of the shaping element where the two films of glass are brought together to form the ware.

Where the embodiment of Fig. 7 is employed, of course it is not necessary that the blow pipe be supported in the manner illustrated in Figs. 1 and 2 since it merely extends upwardly to a point where blowing air can be conveniently supplied to it. In the one embodiment (Figs. 1 and 2) the blow pipe supports the shaping element, whereas in the other embodiment (Fig. 7) the blow pipe is supported through the shaping element on a suitably supported conduit which receives the glass from the trough or from some other suitable source.

A glass-shaping chamber 86 is formed around the glass-shaping element by a refractory block 87 and a refractory shell 88. The block 87 has a centrally disposed opening 89 therein which is positioned below the outlet 9. The shell 88 is spaced below the block 87. While the glass is passing downwardly over the shaping element, it may be desirable to cool the glass or to supply heat thereto. Either may be accomplished by a burner structure 90 positioned at the lower end of the shell. If it is desired to supply heat to the interior of the shell, a combustible gas can be fed through the burner structure. A pipe 91 having a control valve 92 therein leads to the burner structure and may be connected to any suitable source of gas.

It will be apparent from the above that in the structure which I provide a continuous uniform flow of glass is obtained downwardly along the outside and along the inside of the shaping element and that these films of glass unite at the bottom end of the shaping element to form the ware. It will also be apparent that, due to the character of the support which I provide for the shaping element, drawing lines are reduced to a minimum while at the same time glass is delivered to and from the shaping element at a rate which will permit the drawing of thicker walled tubing than can be made on apparatus used heretofore in tube manufacture and that greater speeds of draw are made possible.

While I have shown and described several embodiments of my invention, it will be understood that it may be otherwise embodied within the scope of the appended claims.

I claim:

1. In glassware-forming apparatus, a glass-shaping element, a support within but spaced from said element for supporting it, a plurality of removable, spaced supporting keys extending between said element and said support for supporting the shaping element thereon, said support having an enlargement adjacent the keys which, together with the element, provides a restricted orifice between the support and the element, and means for flowing glass through said orifice.

2. In glassware-forming apparatus, a hollow glass-shaping element having an inwardly extending continuous shoulder, a member located in the element having a diameter smaller than the inner diameter of the element and having an outwardly extending continuous shoulder, a plurality of supports located intermediate the shoulders for engaging the element, said supports being spaced peripherally around said shoulders to provide passageways therebetween, means cooperating with the member for supporting it and the element, and means for flowing glass through said passageways.

3. In glassware-forming apparatus, a hollow element having an inwardly extending continuous shoulder, a member located within the element having a diameter smaller than the inner diameter of the element and having an outwardly extending continuous shoulder, a plurality of supports located intermediate the shoulders for engaging the element and connecting the element and the member, said supports being spaced peripherally around said shoulders to provide passageways therebetween to permit glass to flow between the element and the member and about the supports, each of said supports having inclined faces at one end thereof to cause the glass passing therearound to unite before it leaves the element.

4. In glassware forming apparatus, a hollow glass-shaping element, a supporting member located within the shaping element and having a diameter smaller than the diameter of the shaping element, a plurality of spaced, supporting elements extending between the supporting member and the shaping element for supporting the shaping element, and means for flowing molten glass downwardly along the outer surface of the shaping element and through said hollow shaping element between the inner surface thereof and the supporting member and around said supporting elements, said supporting member having a shoulder thereon projecting toward the shaping element to provide a restricted passageway.

5. In glassware forming apparatus a hollow element having an inwardly extending continuous shoulder, a member located within the element having a diameter smaller than the inner diameter of the element and having an outwardly extending continuous shoulder, a plurality of supports located intermediate the shoulders for engaging the element and connecting the element and the member, said supports being spaced to permit the glass to flow between the element and the member and having converging inclined faces to cause the glass passing downwardly around the supports to be reunited to form a continuous film of glass passing downwardly along the surface of the element, the inclined faces for causing union of the glass passing downwardly around the supports being positioned above the said outwardly extending shoulder.

6. In glassware forming apparatus, a hollow glass-shaping element, a supporting member located within the element having a diameter smaller than the diameter of the element, a plurality of spaced supporting keys extending between said supporting member and said element, and means for flowing molten glass downwardly between said hollow element and said supporting member, said supporting member having a shoulder projecting toward the shaping element to provide a restricted passageway.

7. In apparatus for forming glass tubing, a vertically extending hollow element having an inwardly extending continuous shoulder, a member located in the element and having an outwardly extending continuous shoulder, a plurality of removable spaced keys extending between the shoulders having surfaces on each end inclined to vertical planes extending through the vertical longitudinal axis of the element to cause division and union of the glass as it passes the ends of the keys in the space between the member and the element.

8. In apparatus for forming glass tubing a hollow glass-shaping element, means for conveying glass to the upper end of the element, a blow pipe having a bushing surrounding the lower end thereof, the element having an inwardly-extending flange and the bushing having an outwardly-extending flange, a plurality of elongated removable keys having end surfaces for contacting the flanges for supporting the shaping element on the bushing, and a pair of surfaces located on at least one end of each key and inclined to each other and to the longitudinal axis of the key for uniting the glass as it flows between the bushing and the element.

9. Apparatus for forming glass tubing comprising a source of molten glass, a hollow shaping element, a vertically extending supporting member extending into the shaping element and spaced from the inner wall of the element for supporting it vertically, a plurality of spaced supporting elements extending between the supporting member and the inner wall of said shaping element for supporting the shaping element on the member, and means for feeding an annular stream of glass from said source to the upper end of said shaping element and for causing it to flow downwardly along the inner and outer walls thereof.

10. Apparatus for forming glass tubing comprising a source of molten glass, a hollow shaping element, a vertically extending supporting member extending into the shaping element and spaced from the inner wall of the element for supporting it vertically, a plurality of spaced supporting elements extending between the supporting member and the inner wall of said shaping element for supporting the shaping element on the member, said supporting member having an enlarged portion to provide a restricted opening between it and the shaping element below said supporting elements, and means for feeding an annular stream of glass from said source to the upper end of said shaping element and for causing to to flow downwardly along the inner and outer walls thereof.

11. Apparatus for forming glass tubing comprising a source of molten glass, a hollow shaping element, a vertically extending supporting member extending into the shaping element and spaced from the inner wall of the element for supporting it vertically, a plurality of spaced supporting elements extending between the supporting member and the inner wall of said shaping element for supporting the shaping element on the member, each of said supporting elements having converging inclined faces adjacent one end thereof, and means for feeding an annular stream of glass from said source to the upper end of said shaping element and for causing it to flow downwardly along the inner and outer walls thereof.

12. Apparatus for forming glass tubing comprising a source of molten glass, a hollow shaping element, a vertically extending supporting member extending into the shaping element and spaced from the inner wall of the element for supporting it vertically, a plurality of spaced supporting elements extending between the supporting member and the inner wall of said shaping element for supporting the shaping element on the member, said supporting member having an enlarged portion to provide a restricted opening between it and the shaping element below said supporting elements, each of said supporting elements having converging inclined faces on each end thereof, and means for feeding an annular stream of glass from said source to the upper end of said shaping element and for causing it to flow downwardly along the inner and outer walls thereof.

EDWARD DANNER.

REFERENCES CITED

The following references are of record in the file of this patent:

UNITED STATES PATENTS

| Number | Name | Date |
| --- | --- | --- |
| 2,069,377 | Mattiessen | Feb. 2, 1937 |
| 2,133,662 | Gray | Oct. 18, 1938 |